United States Patent [19]

Ohuchi et al.

[11] Patent Number: 5,223,233

[45] Date of Patent: Jun. 29, 1993

[54] METHOD OF CONCENTRATING PLUTONIUM NITRATE SOLUTION AT LOW TEMPERATURE

[75] Inventors: Jin Ohuchi; Isao Kondo, both of Naka; Takashi Okada, Katsuta, all of Japan

[73] Assignee: Doryokuro Kakunenryo Kaihatsu Jigyodan, Tokyo, Japan

[21] Appl. No.: 748,067

[22] Filed: Aug. 21, 1991

[30] Foreign Application Priority Data

Oct. 1, 1990 [JP] Japan ................................ 2-263378

[51] Int. Cl.⁵ ...................... C22B 60/04; C01G 56/00
[52] U.S. Cl. ................................. 423/11; 423/3; 423/251; 252/627
[58] Field of Search .................... 423/3, 11, 251; 252/627

[56] References Cited

U.S. PATENT DOCUMENTS 3,949,048  4/1976  Holt, Jr. .................................... 423/8
4,759,878  7/1988  Henrich et al. ...................... 252/627
4,981,616  1/1991  Ohtsuka et al. ...................... 252/632

OTHER PUBLICATIONS

Preliminary Report, 1990 Fall Meeting of the Atomic Energy Society of Japan, published on Sep. 10, 1990.

*Primary Examiner*—Donald P. Walsh
*Assistant Examiner*—Ngoclan T. Mai
*Attorney, Agent, or Firm*—Wenderoth, Lind & Ponack

[57] ABSTRACT

A method of concentrating a plutonium nitrate solution comprising the steps of cooling the plutonium nitrate solution to a temperature of $-60°$ to $-40°$ C. to produce a frozen matter comprising of water and nitric acid, and filtering the thus produced frozen matter to recover a concentrated plutonium nitrate solution as a filtrate.

3 Claims, 1 Drawing Sheet

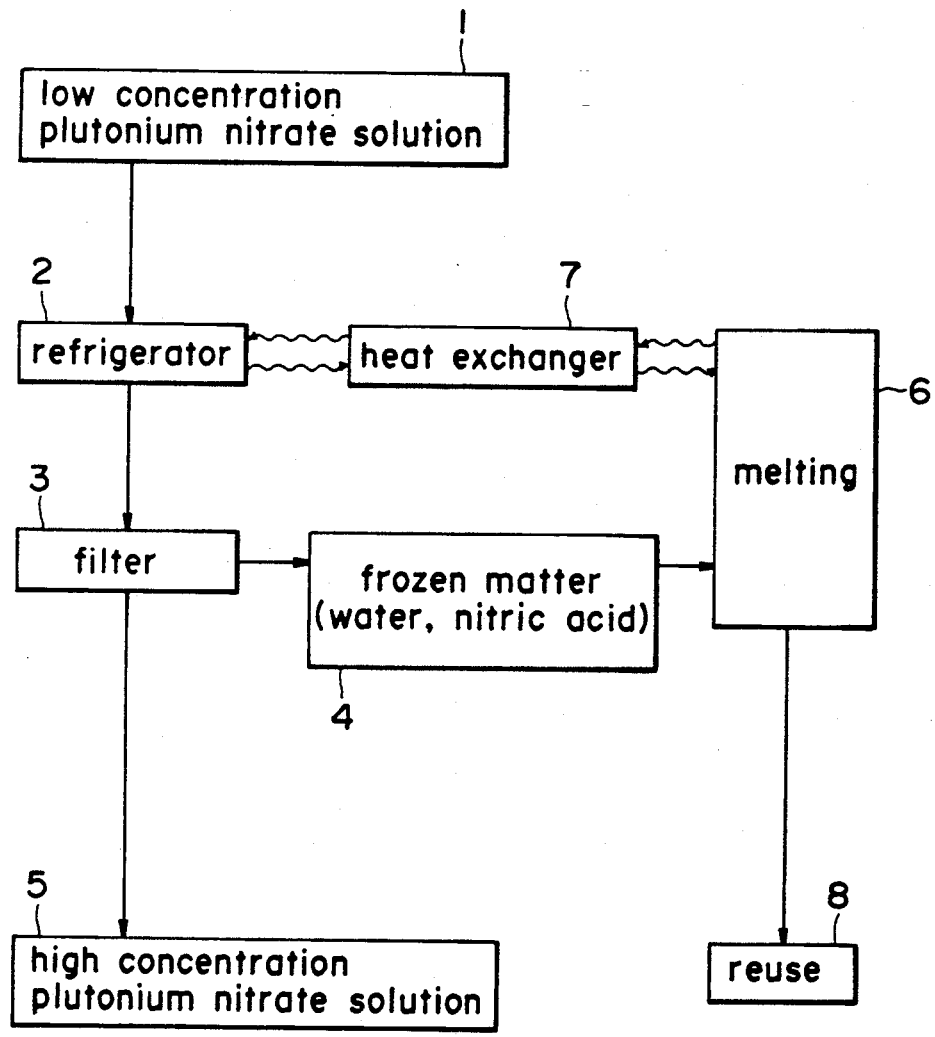

METHOD OF CONCENTRATING PLUTONIUM NITRATE SOLUTION AT LOW TEMPERATURE

BACKGROUND OF THE INVENTION

The present invention relates to a method of effectively concentrating a plutonium nitrate solution which is produced in reprocessing spent nuclear fuel or in a wet recovery process in nuclear fuel production.

A plutonium nitrate solution has heretofore been concentrated by thermal distillation with the use of an evaporator, which, however, suffers disadvantages such that:

1) heating at a high temperature causes corrosion of the evaporator, 2) the corrosion of the evaporator allows the materials of construction for the evaporator to dissolve in the plutonium nitrate solution as impurities, 3) since nitric acid in the plutonium nitrate solution is also concentrated by heating, the corrosion of the evaporator is further accelerated, and a step of adjusting acid concentration after the concentration step is required, and 4) heating at a high temperature creates a possible hazard of fire or explosion.

SUMMARY OF THE INVENTION

It is an object of the present invention to provide a safe and efficient method of concentrating a plutonium nitrate solution which is capable of eliminating the above-described disadvantages involved in the conventional process for concentrating a plutonium nitrate solution by thermal distillation.

According to the present invention, there is provided a method of concentrating a plutonium nitrate solution comprising the steps of cooling the plutonium nitrate solution to a temperature of $-60°$ to $-40°$ C. to produce a frozen matter comprising water and nitric acid, and filtering the thus produced frozen matter to recover a concentrated plutonium nitrate solution as a filtrate.

The solubility of plutonium nitrate in nitric acid is so high even at a low temperature around $-60°$ C. that a plutonium nitrate solution, when cooled to a low temperature around $-60°$ C., produces a frozen matter comprising of water and nitric acid. When the frozen matter is filtered away, the plutonium nitrate in the residual solution is concentrated. As a result, the plutonium nitrate alone can be concentrated without causing an increase in nitric acid concentration.

BRIEF DESCRIPTION OF THE DRAWING

The attached drawing is a block flow diagram showing a preferable embodiment of the method according to the present invention.

PREFERRED EMBODIMENT OF THE INVENTION

Referring now to the drawing, a low-concentration plutonium nitrate solution 1 obtained in a reprocessing process for spent nuclear fuel or in a wet recovery process of nuclear fuel production is cooled or chilled to $-60°$ to $-40°$ C. with a refrigerator 2. By this cooling, a frozen matter comprising water and nitric acid is produced in the refrigerator 2. Subsequently a mixture of the frozen matter with the solution is introduced into a filter 3 which has been cooled in advance to a low temperature. In the filter 3, the frozen matter 4 is filtered from the solution and a filtrate is recovered as a high-concentration plutonium nitrate solution 5.

A method of suction filtration or pressure filtration may be employed in the filtration of the frozen matter in the filter 3.

The separated frozen matter 4 comprising water and nitric acid is melted 6, and the heat generated in melting can be used for cooling in the refrigerator 3 by the heat exchange through a heat exchanger 7. On the other hand, the nitric acid solution formed by melting can be reused 8 by circulating it through a fuel reprocessing process or wet recovery process.

According to one experimental result, a plutonium nitrate solution having a plutonium concentration of 118 g/l and a nitric acid concentration of 2.7M was allowed to stand at $-45°$ C. for two hours to form a sherbet-like frozen matter in the solution. The filtrate obtained by separating the frozen matter by suction filtration had a plutonium concentration of 139 g/l, that is, concentrated by approximately 1.18 times and a nitric acid concentration of 2.5M.

According to the method of the present invention as described hereinbefore, the following effects can be attained:

1) By virtue of the low temperature process, the present method can provide a highly safe method free from the hazard of fire or explosion as compared with the conventional method of concentration by thermal distillation.

2) Also, the low temperature process can suppress the corrosion of the materials of construction for the equipment. Consequently, a long-term stable operation of the equipment is made possible, thus improving the economic efficiency of the operation.

3) Since the corrosion of the material of construction for the equipment is suppressed, impurities due to the leaching of the materials can be prevented from being mixed into the solution.

4) By virtue of a relatively small increase in nitric acid concentration in the solution, the step of adjusting the nitric acid concentration after the concentrating step can be simplified.

5) It is possible to attain energy saving by utilizing the heat of melting of the frozen matter for heat exchange in a refrigerator.

While the present invention has been described with respect to preferred embodiments, it should be apparent to those skilled in the art that numerous modifications may be made thereto without departing from the scope of the invention.

What is claimed is:

1. A method of concentrating a plutonium nitrate solution comprising the steps of cooling the plutonium nitrate solution to a temperature of $-60°$ to $-40°$ C. to produce a frozen matter comprising water and nitric acid, and filtering the thus produced frozen matter to recover a concentrated plutonium nitrate solution as a filtrate.

2. The method according to claim 1, wherein the filtered frozen matter is melted and the heat of melting is used in the cooling step through a heat exchanger.

3. The method according to claim 1, wherein the step of filtering is carried out by suction filtration or pressure filtration.